United States Patent Office 3,126,604
Patented Mar. 31, 1964

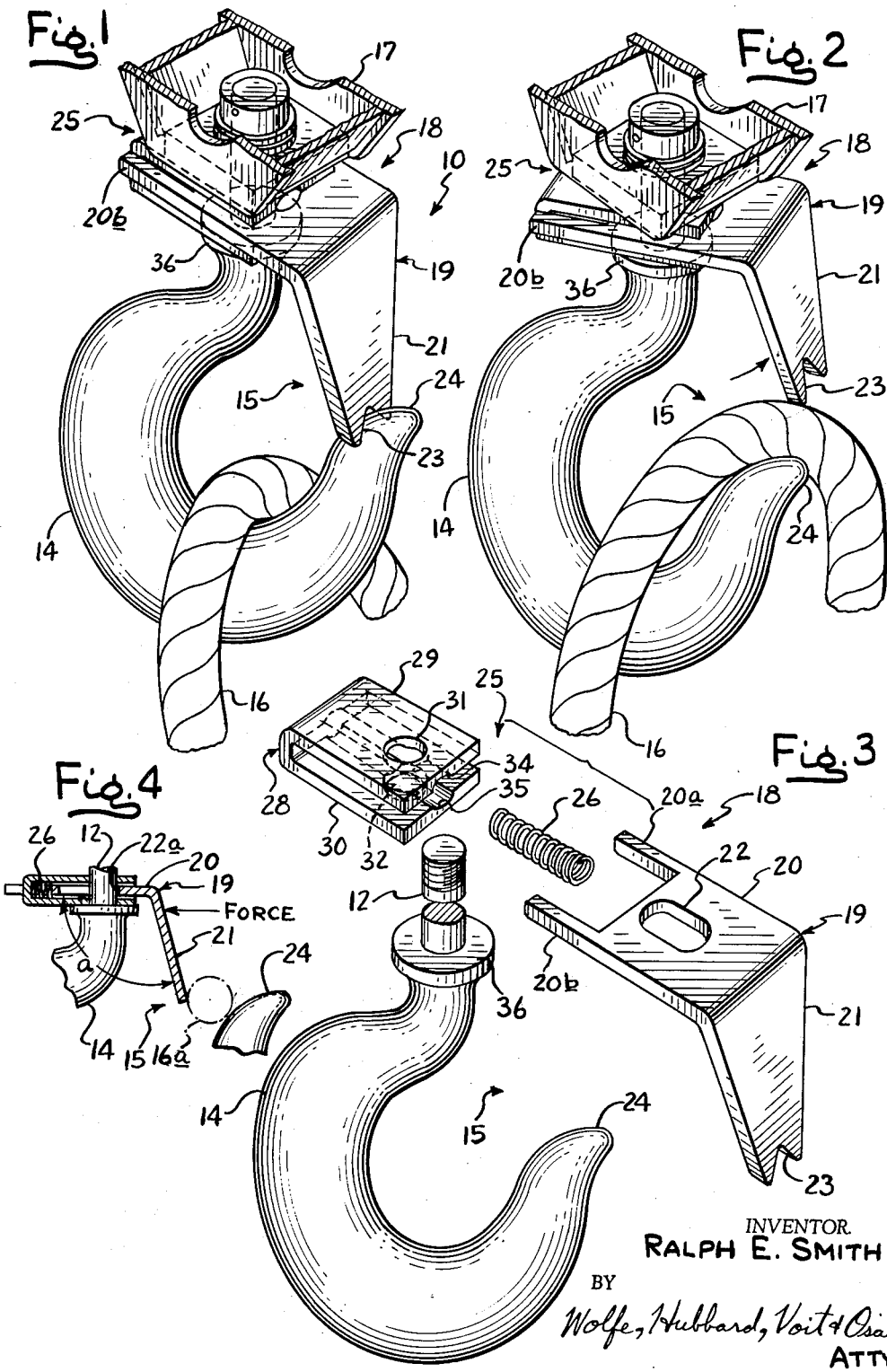

3,126,604
HOOK WITH SAFETY LOCK
Ralph E. Smith, Spring Lake, Mich., assignor to Manning, Maxwell & Moore, Incorporated, Muskegon, Mich., a corporation of New Jersey
Filed Sept. 21, 1962, Ser. No. 225,226
4 Claims. (Cl. 24—241)

The present invention relates to load engaging hooks and more particularly to such hooks having a safety lock for preventing accidental removal of a load.

It is an object of the present invention to provide a hook with a safety lock for maintaining the hook attached to a load with the safety lock being easily releasable to receive or remove the load.

It is a further object of the present invention to provide a hook safety lock which operates in a limited space between hook-open and hook-closed positions yet which opens the hook throat to receive large diameter cables and the like. It is a more specific object of the present invention to provide a latch arrangement for a lifting hook which may be swung clear of the cable or lifting eye to be engaged, and which therefore has a longer life than conventional latches which are subject to repeated abuse when objects are placed on, and removed from, the hook.

It is an overall object of the present invention to provide an economically manufacturable, simple, and reliable hook safety lock adaptable for both light and heavy duty use.

Other objects and advantages of the invention will become apparent upon reading the following detailed description and upon reference to the drawings in which:

FIGURE 1 is a perspective of a hook with a safety lock constructed in accordance with the present invention.

FIG. 2 is a perspective showing the latch pivoted to the hook throat opened position for reception or removal of a load.

FIG. 3 is an exploded view of the hook and the safety locking structure.

FIG. 4 is a fragmentary section in reduced scale of an alternative mode of operation in which the latch is simply pressed back for admission of a light cable or the like.

While the invention will be described in connection with a preferred embodiment, it will be understood that I do not intend to limit the invention to such embodiment, but, on the contrary, I intend to cover all alternatives, modifications and equivalents as may be included within the spirit and scope of the invention as defined by the appended claims.

Turning to the drawings, there is shown in FIG. 1 a safety hook 10 embodying the present invention. The hook 10 includes a shank 12 and rigid therewith a curved bill 14 for defining a hook throat 15. The latter is adapted to receive a load 16 for example a cable or a ladle bail. Hooks of this type find particular, though by no means exclusive, utility in overhead hoists and the like and are customarily carried on a swivel 17 as generally shown in FIGS. 1 and 2.

In accordance with the present invention a safety locking structure 18 is mounted on the shank 12 for movement between positions closing and opening the hook throat. As shown in the drawings, the locking structure 18 of the preferred embodiment includes a generally L-shaped latch 19 mounted on a cylindrical portion of shank 12 for both transverse and pivotable movement, respectively, between positions closing and opening the hook throat. The preferred embodiment of latch 19 includes a body portion 20 and integral therewith an extending leg portion 21. The body 20 has an elongated opening 22 for receiving the shank 12, and a pair of extending fingers 20a and 20b, the purpose of which is explained subsequently. The leg 21 has a bifurcated end 23 to engage a hook bill tip 24 for holding the latch against pivoting when the safety locking structure is in a position closing the hook throat. A biasing assembly 25 acts positively on the latch 19 to urge the latch leg end 23 outwardly and, in one position of the latch, into engagement with the bill tip. The biasing assembly 25 also allows easy disengagement of the leg from the hook bill so that the latch 19 can be pivoted to open the hook throat 15 for reception or removal of a load. In the present instance assembly 25 takes the form of a spring 26 received in a U-shaped retainer or cage 28. The latter has a pair of legs 29, 30 with axially alined apertures 31, 32 at one end for receiving the shank 12. The opposing surfaces of the legs 29, 30 have recesses 34, 35 respectively, for receiving the spring 26. Though the biasing assembly 25 takes a particular form in the preferred embodiment, it is within the teachings of the present invention to use other forms of the spring 26 and cage 28 to perform the function of urging the latch 19 outwardly toward the bill tip while allowing the latch to be pivoted away from the bill tip.

To assemble the safety locking structure on the hook 10, the spring 26 is fitted into the recesses 34, 35 and the latch body portion is inserted between legs 29, 30. The latch body portion is then pressed against the spring 26 until the elongated opening 22 and the apertures 31, 32 of the retainer legs come into register so that the shank 12 can be received therein. A seat 36, in the present instance an annular shoulder, is provided at the junction of the hook shank 12 and curved bill 14 on which the safety locking structure 18 rides. The extending latch body portion fingers 20a, 20b, respectively, are disposed on opposite sides of retainer 28, so that as the latch 19 is pivoted the retainer 28 is brought around and the spring is not forced out sideways. Furthermore in the exemplary structure, the latch 19 is guided by the extending portions 20a, 20b so that the latch must first move rearwardly before disengaging the bill tip.

As is clear the following explanation of operation, the safety locking assembly is reliable yet easy to operate. Assuming the latch to be in a position closing the hook throat 14 as shown in FIG. 1, to open the hook throat (see FIG. 2) either to receive or to remove a cable or the like, the latch 19 is first slid transversely relative to the shank just enough for the latch leg bifurcated end 23 to disengage the bill tip 24. After the leg disengages the hook bill, it can be pivoted sideways about the shank 12 opening the hook throat 14. The pivoting movement occurs easily and the cable pressing against the latch during reception of a load effectuates it. This is especially desirable where space restrictions or environmental conditions limit the extent to which the locking structure can be maneuvered. Because the latch can be swung around adjacent the rear of the hook bill 14, the hook throat 15 can be fully opened.

After the load has been received in the hook, it is safety locked against accidental removal by bringing the latch 19 into a position closing the hook throat. To achieve this end, first the latch 19 is pivoted around next to the bill tip 24 and then pressed inwardly and turned so that the bifurcated end 23 is opposite the bill tip 24. Upon release of the latch which is urged outwardly by the spring 26, leg 21 presses against the tip and safety locks the hook. In an application where the latch 19 cannot be manually handled, for example, the previously mentioned handling of hot steel, a pole or like tool can be used to pivot the latch around and press it inwardly to swing the leg end opposite the bill tip. The locking action is positive in that the biasing spring continually urges the latch outwardly so that the latch leg tends to lock on the hook bill tip. Because of its length and the obtuse angle (see *a* in FIG. 4) at which depending leg 21 is disposed relative to the sliding leg 20, the latch is locked against accidental opening upon being pressed by a cable or the like. Should a load press against leg 21 the leg 20 tends to bind. Accordingly, the present safety lock assembly prevents opening of the hook 10 by accidental butting of the latch 19 during shop operation.

While sliding movement of the latch is purposely quite limited in the present construction, i.e., sufficient to permit disengagement between the bifurcated end of the latch and the tip of the bill, nevertheless this sliding movement may be sufficient to permit light cables or the like to be engaged with the hook by movement through a clearance space between the latch and the hook without necessity for rotating the latch relative to the shank upon which it is mounted. This possibility is shown in FIG. 4. Note, however, that to open the latch force is applied at the upper end of the latch in substantial alinement with the direction of sliding movement. As stated, any attempt to simply slip the cable over the top of the hook without applying intentional releasing force is accompanied by binding at the upper leg. If desired, the angle *a* shown in FIG. 4 may be increased as further assurance against unwanted entry. In short, it is one of the features of the present hook and latch that intentional releasing effort is required on the part of the operator during both engagement and disengagement of a cable or lifting eye.

In addition to the adavntages recited above, the safety lock structure is simple and economical to manufacture. Because the size of the individual elements can be easily changed the safety lock is adaptable for light or heavy duty work.

It will be understood in the following claims that the term "bifurcated" is intended to cover any top profile on the latch capable of registered engagement with the top of the hook when the latch is in its outwardly extending position.

I claim as my invention:

1. In a load engaging hook construction the combination comprising a shank having a cylindrical portion, a curved bill rigid with said shank for defining a hook throat and having a bill tip, a U-shaped retainer including parallel walls having alined apertures for reception of the shank, a generally L-shaped latch having a first flat leg which is snugly received between the walls of the retainer for in and out sliding movement with respect thereto and having a second flat leg terminating in a bifurcated tip, biasing means interposed between the retainer and the latch for forcing the latter outwardly with respect to the retainer so that the tip of the bill is normally engaged by the bifurcated tip on the second leg of the latch, the second leg of the latch being sufficiently elongated and arranged at such an obtuse angle with respect to the first leg so that any attempt to wedge a cable or the like between the bifurcated tip and the tip of the bill free of intentional inward force alined with the direction of latch movement results in binding between the first leg of the latch and the retainer.

2. In a load engaging hook construction the combination comprising, a vertical shank, a curved bill rigid with said shank for defining a hook throat and having a bill tip, a retaining member bodily pivoted on said shank, a generally L-shaped latch having a first leg slidably received in the retainer and having a second leg angled downwardly toward the bill tip, biasing means interposed between the retainer and the latch for forcing the latter outwardly with respect to the retainer so that the tip of the bill is normally engaged by the tip on the second leg of the latch, said retainer and said first leg being provided with cooperating guide surfaces for constraining the latch to telescoping movement relative to the retainer so that the retainer and the latch are pivotable as a unit about said shank following disengagement of the latch from the bill tip.

3. A safety hook comprising in combination, a shank, a curved bill rigid with said shank for defining a hook throat and having a bill tip, a safety lock structure mounted on said shank for transverse and pivotal movement relative thereto and including a latch having a body portion and an integral extending leg portion, said body portion having an elongated opening for receiving said shank, said leg portion having a bifurcated end for engagement with said bill tip, and a biasing means for urging said latch leg portion toward said bill tip including a spring and a retainer pivotally mounted on said shank, said retainer and said latch body portion cooperating to maintain said spring captive during common pivotal movement of said latch and retainer about said shank, said latch body portion extending substantially longitudinally relative to said retainer for effecting a binding action on said latch body portion during application of pressure at an angle to the body portion thereby portecting against accidental unlatching of said hook bill while allowing sliding movement of said latch in response to pressure alined with said retainer for selective disengagement of said latch leg bifurcated end from said bill tip for opening said hook bill to receive or remove a load.

4. In a load engaging hook construction the combination comprising, a shank having a vertical shank, a curved bill rigid with said shank for defining a hook throat and having a bill tip, a U-shaped retainer including parallel walls having alined apertures for reception of the shank, a generally L-shaped latch having a first leg which is snugly received between the walls of the retainer for in and out sliding movement with respect thereto and having a second leg terminating in a bifurcated tip, biasing means interposed between the retainer and the latch for forcing the latter outwardly with respect to the retainer so that the tip of the bill is normally engaged by the bifurcated tip on the second leg of the latch, said first leg provided with rearwardly extending portions for engaging said retainer for effecting a common pivotal movement of said retainer with said latch while guiding said latch during inward movement for disengaging said latch second leg from said bill tip, the second leg of the latch being sufficiently elongated and arranged at such an obtuse angle with respect to the first leg so that any attempt to wedge a cable or the like between the bifurcated tip and the tip of the bill free of intentional inward force alined with the direction of latch movement results in binding between the first leg of the latch and the retainer.

References Cited in the file of this patent

UNITED STATES PATENTS

| | | |
|---|---|---|
| 500,531 | Camp | June 27, 1893 |
| 1,375,301 | Kuffel | Apr. 19, 1921 |
| 1,414,041 | Pennington | Apr. 25, 1922 |
| 1,464,134 | Hoy | Aug. 7, 1923 |
| 1,715,192 | Fortin | May 28, 1929 |
| 1,828,714 | Klintworth | Oct. 20, 1931 |
| 2,835,013 | Thompson | May 20, 1958 |

FOREIGN PATENTS

| | | |
|---|---|---|
| 499,245 | Great Britain | Jan. 20, 1939 |